United States Patent [19]

Okamoto et al.

[11] 4,222,031
[45] Sep. 9, 1980

[54] WARNING DEVICE FOR A VEHICLE

[75] Inventors: Michio Okamoto, Kanagawa; Tohru Fukumura, Hatan; Minoru Ichikawa, Isehara; Masaru Uenoyama, Kanagawa; Masaaki Ichimura; Masakazu Tateishi, both of Kawasaki, all of Japan

[73] Assignee: Kabushiki Kaisha Komatsu Seisakusho, Tokyo, Japan

[21] Appl. No.: 947,763

[22] Filed: Oct. 2, 1978

[51] Int. Cl.² .................................................. G08B 19/00
[52] U.S. Cl. ................................ 340/52 F; 307/10 R; 340/516; 340/525
[58] Field of Search ................... 340/52 F, 502, 516, 340/520, 521, 524, 525; 307/10 R

[56] References Cited

U.S. PATENT DOCUMENTS

| 3,764,974 | 10/1973 | Melian | 340/52 F |
| 3,855,572 | 12/1974 | Olson | 340/52 F |
| 4,053,868 | 10/1977 | Cox et al. | 340/525 X |
| 4,136,329 | 1/1979 | Trobert | 340/52 F |

Primary Examiner—John W. Caldwell, Sr.
Assistant Examiner—Joseph E. Nowicki
Attorney, Agent, or Firm—Spensley, Horn, Jubas & Lubitz

[57] ABSTRACT

A warning device for a vehicle is capable of checking a disorder in the vehicle in a sequential order through a dialog between the device and an operator. The device first indicates conduction of a test before a starter is turned on and the operator depresses a test switch in compliance with this indication to test whether all indication units and buzzer can operate normally. After finishing this test, any disorder which may exist at various starting check points such as a hydraulic fluid level and a radiator water level is detected by an associated indication unit. After the starting check up has been completed and the starter is turned on, driving check points such as a torque converter oil temperature and a brake air pressure are constantly watched and if there occurs any disorder in such check points, the operator is informed of such disorder by operation of all of the indication units and the buzzer. The operator then operates only the indication unit associated with the check point where the disorder has occurred by manipulation of a check switch.

12 Claims, 4 Drawing Figures

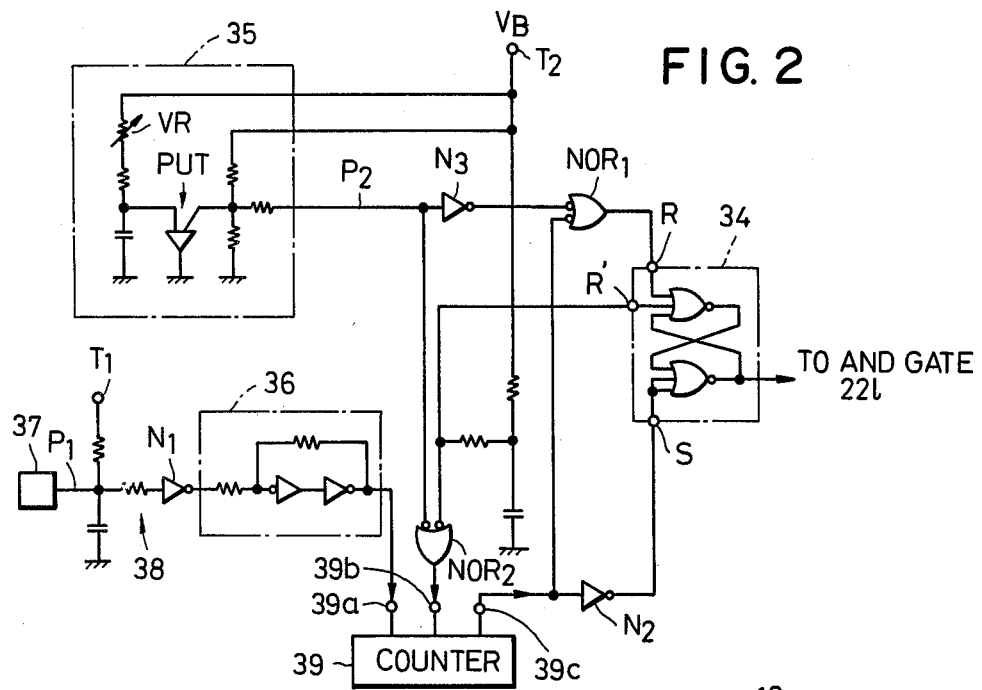
FIG. 2
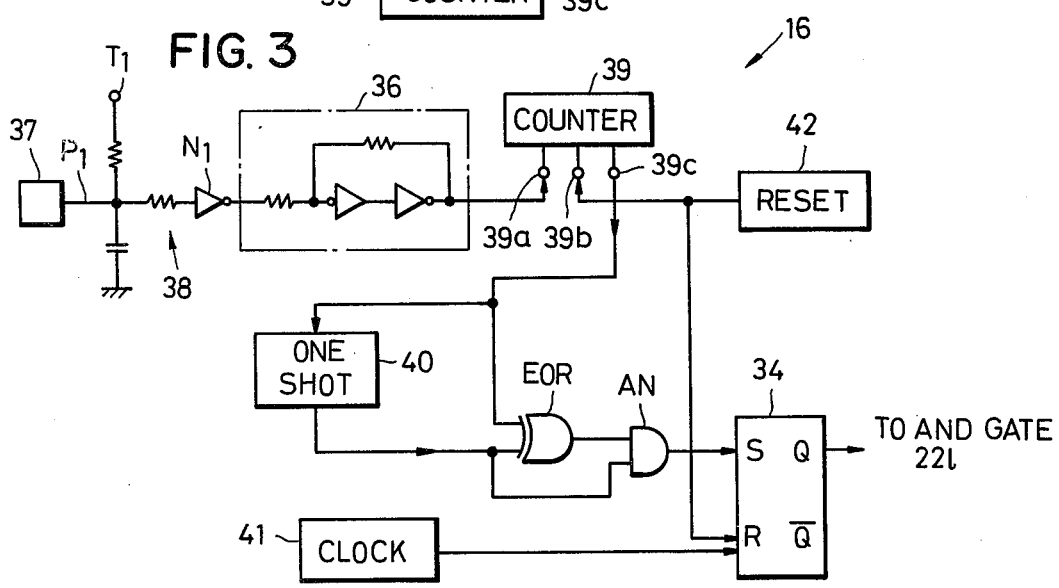
FIG. 3
FIG. 4(a)
FIG. 4(b)
FIG. 4(c)
FIG. 4(d)
FIG. 4(e)

WARNING DEVICE FOR A VEHICLE

BACKGROUND OF THE INVENTION

This invention relates to a warning device for detecting abnormal conditions in a vehicle and thereupon issuing warning.

Various warning devices have heretofore been proposed and used for detecting abnormal conditions in vehicles such as dump trucks and other automobiles. Such known warning devices include sensors provided in various checking points in a vehicle and issuing warning by suitable indication means such as indication lamps. These warning devices are defective in that the warning indicated by the indication lamp tends to be overlooked if there are many check points. Besides, these warning devices are of such a construction that the indication lamps are not lighted if all equipments are operated normally in checking up before starting of the vehicles. In such known devices, however, abnormal conditions cannot be indicated if the lamp or the like indiction means is out of order. There are some devices in which means for checking the disorder of the indication means is provided, but drivers in actual practice often neglect or forget utilizing such checking means. Further, in detection of a water level in a radiator, the known devices have the disadvantage that rocking or inclination of a vehicle body during running of the vehicle tends to produce an erroneous operation of the warning device. Furthermore, the known devices have no means for preventing an erroneous starting of the vehicle due to overlooking of a sparking brake indication resulting in undue wear of a brake lining.

SUMMARY OF THE INVENTION

It is, therefore, an object of the present invention to provide a warning device for a vehicle capable of detecting malfunction of an indication unit during starting check up of the vehicle and, in addition thereto, capable of accurately giving a warning in a case where a disorder occurs during driving by a warning operation in two steps, namely an operation of the entire indication unit and an operation of a part of the indication unit corresponding to a portion where an abnormal state exists.

It is another object of the invention to provide a warning device for a vehicle capable of periodically driving the indication unit when the revolution number of a vehicle engine exceeds a normal value.

It is another object of the invention to provide a warning device for a vehicle capable of indicating as abnormal a state in which a parking brake is being applied while a shift lever is in a position other than a neutral position.

It is still another object of the invention to provide a warning device for a vehicle capable of indicating an abnormal state of a radiator water level not only during checking up before the starting of the vehicle but also during driving thereof.

These and other objects and features of the invention will become apparent from the description made hereinbelow in conjunction with the accompanying drawings.

BRIEF DESCRIPTION OF THE DRAWINGS

In the accompanying drawings:

FIG. 2 is a circuit diagram showing an example of an engine overrevolution sensor used in the warning device;

FIG. 3 is a circuit diagram showing another example of the engine overrevolution sensor; and FIG. 4 is a graphical diagram showing waveforms appearing in some portions in the circuit shown in FIG. 3.

DESCRIPTION OF A PREFERRED EMBODIMENT

Figure 1:
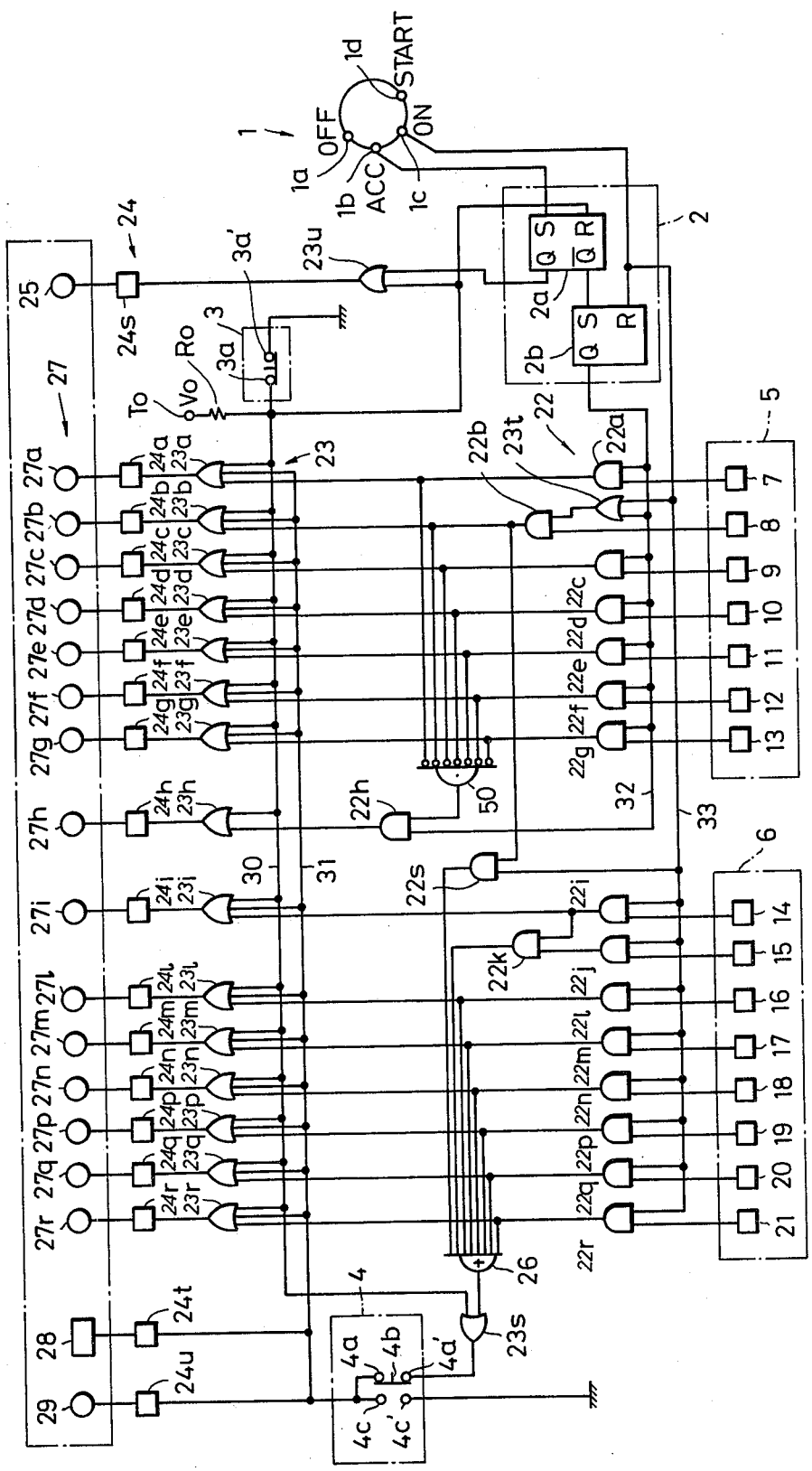
FIG. 1 is a circuit diagram showing an embodiment of the warning device for a vehicle made according to the present invention.

Referring first to FIG. 1, a start and drive signal circuit 2 includes flip-flop circuits 2a and 2b. The flip-flop circuit 2a has its set input terminal S connected to an ACC terminal 1b of a key switch 1 and its reset input terminal R to a terminal To via a resistor $R_0$. A predetermined voltage $V_0$ is applied to the terminal $T_0$. A set output terminal Q of the flip-flop circuit 2a is connected to a driver circuit 24S via an OR gate 23u and this driver circuit 24S in turn is connected to a test indication light emitting diode 25. The flip-flop circuit 2b has its set input terminal S connected to a reset output terminal $\overline{Q}$ of the flip-flop circuit 2a and its reset input terminal R to an ON terminal 1c of the key switch 1. A set output terminal Q of the flip-flop circuit 2b is connected to AND gates 22a, 22c through 22h and OR gate 23t via a line 32. AND gates 22i, 22j through 22r and 22S are connected to the ON terminal 1c via a line 33. A starting check unit sensor group 5 consists of a group of sensors including a hydraulic fluid lever sensor 7, a radiator water level sensor 8, a brake oil level sensor 9, a torque converter oil level sensor 10, an engine oil level sensor 11, a battery water level sensor 12 and a lamp burn-out sensor 13. These sensors 7-11 are constructed, for example, of floats and reed relays for detecting liquid levels of the respective component parts. The battery water sensor 12 may be constructed in such a manner that the water level can be detected by a potential difference between an electrode inserted in the battery water and ground. As the lamp burn-out sensor 13, a bridge circuit composed of filaments and resistance elements of respective lamps may be used for detecting burning out of any of the filaments. The sensors 7-12 produce an output signal if the liquid level falls below a determined level and the sensor 13 produces an output signal if any of the filaments increases its resistance or is burnt out. The output signals of these sensors 7-13 are supplied through the AND gates 22a-22g to OR gates 23a-23g and a NAND gate 50. The output of the NAND gate 50 is applied to an OR gate 23h through the AND gate 22h.

A driving check unit sensor group 6 consists of a group of sensors including a parking brake sensor 14, a shift lever sensor 15, an engine overrevolution sensor 16, a brake air pressure sensor 17, an engine oil pressure sensor 18, a torque converter oil temperature sensor 19, a brake oil temperature sensor 20, a radiator water temperature sensor 21 and a radiator water sensor 8. The parking brake sensor 14 may be constructed, for example, of a diaphragm type pressure switch if there is an air pressure source or of a limit switch attached to a lever if there is no air pressure source. The parking brake sensor 14 produces an output signal when the parking brake is applied. The shift lever sensor 15 may be constructed, for example, of a limit switch provided on the shift lever and produces an output signal when the shift lever is in a position other than a neutral position. The engine overrevolution sensor 16 produces an output signal periodically if the engine revolution number exceeds a predetermined value. An example of the sensor 16 is shown in FIG. 2. An engine revolution sensor 37 which is made of any conventional type of revolution sensor produces a pulse signal $P_1$ proportional to the revolution number. This pulse signal $P_1$ is applied to an input terminal 39a of a binary counter 39 consisting, for example, of a 7-stage binary counter through a noise prevention circuit 38, an inverter circuit $N_1$ and a waveform rectifying circuit 36. This 7-stage binary counter 39 produces a signal "1" from its output terminal 39c when its count has exceeded 7 bits and this signal "1" is applied to a set input terminal S of a flip-flop circuit 34 via a inverter $N_2$. A reference revolution number setting circuit 35 is composed, for example, of an oscillator circuit using a PUT (programmable uni-junction transistor) and produces a pulse signal $P_2$ of a period T. This period $P_2$ is applied to a reset input terminal 39b of the binary counter 39 via a NOR gate $NOR_2$ and also to a reset terminal R of the flip-flop circuit 34 via an inverter $N_3$ and a NOR gate $NOR_1$ to reset them during the period T. The value of the period T can be set at a desired value by means of a variable resistor VR. The binary counter 39 and the flip-flop circuit 34 are also reset by a battery voltage VB applied through a terminal $T_2$. In the flip-flop circuit 34, priority is given to setting.

If the contents of the binary counter 39 exceed 7 bits within the period T upon lapse of which the counter 39 is reset, the counter 39 produces a signal "1" which is applied to the flip-flop circuit 34 to set it and thereby cause it to produce a signal "1". Accordingly, the engine overrevolution sensor 16 periodically produces an output signal when the engine revolution exceeds a predetermined revolution number.

FIG. 3 shows another example of the engine overrevolution sensor 16. In FIG. 3, the same component parts as in the example shown in FIG. 2 are designated by the same reference characters. This sensor 16 compares a pulse width of the output of the engine revolution sensor 37 with a set time period and thereby detects an abnormal rotation of the engine. A pulse waveform of the signal applied to the counter 39 is shown in FIG. 4(a). In this example, four shots of pulses are produced per one revolution of the engine. Accordingly, the output of the counter 39 assumes a waveform shown in FIG. 4(b), the pulse width of this waveform representing a time interval required for one revolution of the engine. A one-shot multivibrator 40 is triggered by the output of the counter 39 and operates in such a manner that its output signal falls to a "O" level upon lapse of the set period T as shown in FIG. 4(c). A time interval during which the level of the output signal of the counter 39 is high decreases as the engine revolution number increases. The output of the counter 39 and the output of the one-shot multivibrator 40 are both applied to an exclusive OR circuit EOR for comparison with each other. The output of the exclusive OR circuit EOR assumes a waveform shown in FIG. 4(d). An AND gate AN receives at one input terminal thereof the output of the exclusive OR circuit EOR and at the other input terminal thereof the output of the one-shot multivibrator 40.

If the engine revolution number is within a normal range, the pulse width of the output waveform of the counter 39 is wider than the set time interval T so that the AND gate AN does not produce an output and the flip-flop circuit 34 is not set. If, however, the engine revolution number exceeds a certain limit, the pulse width of the output waveform of the counter 39 becomes narrower than the set time interval T as shown in the right half portion of FIG. 4. Accordingly, the AND gate AN produces an output signal which is applied to the flip-flop circuit 34 to set it. The set output of the flip-flop circuit 34 is applied to an AND gate 22l (FIG. 1) as an abnormal signal. A clock circuit 41 produces a pulse of a desired period for resetting the flip-flop circuit 34 with the desired period and thereby causing a periodical on and off operation of an indication lamp in case the overrevolution of the engine takes place. A power source reset circuit 42 is of the same construction as the one shown in FIG. 2 and is provided for resetting the counter 39 and the flip-flop 34 when the power switch is thrown in.

The brake air pressure sensor 17 and the engine oil pressure sensor 18 are composed, for example, of diaphragm type pressure switches and produce a signal when the brake air pressure and the engine oil pressure have exceeded set values.

The output signals of these sensors 14 and 16 through 21 are applied to OR gates 23a and 23m through 23r via AND gates 22i and 22l through 22r. The outputs of the AND gates 22i and 22j are applied to the AND gate 22k. The outputs of the AND gates 22k through 22r are applied to an OR gate 23s via an OR gate 26. The set voltage $V_O$ is applied to OR gates 23a through 23s via a line 30 and this line 30 is connected to a contact 3a of the test switch 3. A contact 3a' of the test switch 3 is grounded. As the test switch, a normally closed type push button switch is employed. The respective OR gates 23a through 23r are connected to a brake contact 4a of the check switch 4 via a line 31 and the output of the OR gate 23i is connected to a contact 4a' of the test switch 4. As the check switch 4, a push button switch also is used.

The outputs of the OR gates 23a through 23r are applied to driver circuits 24a through 24r whose outputs in turn are applied to indication lamps 27a through 27r. The signal on the line 31 is applied to drive circuits 24t and 24u whose outputs in turn are applied to an alarm buzzer 28 and a check indication light emitting diode 29.

The test indication light emitting diode 25, the check indication light emitting diode 29, the indication lamps 27a through 27r, the test switch 3 and the check switch 4 are mounted on an operation board in a driver's seat.

The operation of the warning device will now be described.

The operator who has got on board the vehicle (e.g. a dump truck) first turns the key switch 1 from the OFF position to the ACC position. By this operation, the flip-flop circuit 2a is set and the test indication light emitting diode 25 is lighted. After confirming that the test indication light emitting diode 25 is on, the operator pushes off the test switch 3. Since this pushing off of the test switch 3 causes the voltage $V_O$ to be applied to the driver circuits 24a through 24r via the line 30 and the OR gate 23a through 23r, all of the indication lamps 27a through 27r and the check indication light emitting diode 29 are lighted and the alarm buzzer 28 gives an alarm. In this case, the voltage $V_O$ is applied to the reset terminal of the flip-flop circuit 2a to reset it and, accordingly, the flip-flop circuit 2b is set by the reset output "1" of the flip-flop circuit 2a. Since the voltage $V_O$ is applied to the OR gate 23u, the light emitting diode 25 maintains its ON state. Accordingly, the operator can identify operations of these various indication and control units.

If there is a disorder in any of the indication and control units, these indication lamps etc. do not work normally so that the operator can detect the trouble and take necessary steps to remove the trouble. Thus, upon confirming that all of the indication and control units are working normally, the operator pulls on the test switch 3 and proceed to checking of starting check points. As the test switch 3 is pulled on, the indication lamps 27a through 27r and the check indication light emitting diode 29 are extinguished and the alarm buzzer 28 stops giving the alarm.

The set output of the flip-flop 2b is applied to the AND gates 22a through 22h. The sensors 7 through 13 of the starting check unit sensor group 5 start their operation upon turning of the key switch 1 to the ACC position and produce a signal "1" if there is any disorder whereas it does not produce the signal if these is no trouble at all.

Accordingly, the outputs of the AND gates 22a through 22g are "O" if there is no trouble in any of the check points so that the indication lamps 27a through 27g are not lighted. The NAND gate 50 produces a signal "1" and this signal "1" is applied to the driver circuit 24h via the AND gate 22h and the OR gate 23h thereby causing a start OK indication lamp 27h to be lighted. If any of the sensors produces a signal "1" (for example, the radiator water level sensor 8 produces a signal "1" in case the radiator water falls below a predetermined level), this signal "1" is applied to the driver circuit 24b via the OR gate 23b causing the corresponding radiator water indication lamp 27b to be lighted. The operator therefore can detect decrease of the radiator water by the lighting of the lamp 27b. In the above described manner, the operator is informed of any unit where a disorder has occured by lighting of a corresponding indication lamp. If there is a trouble in any of the check points, i.e., if any of the sensor 7 through 13 produces a signal "1", the NAND gate 50 produces a signal "0" so that the start OK indication lamp 27h is not lighted. If the operator fills the radiator with water up to the set level in the radiator, the NAND gate 50 will produce a "1" and the indicator 27h will go on.

After the start ok lamp 27h has lighted, the operator turns the switch 1 to the "ON" position 1c, which resets the flip-flop 2b, thus causing each of the AND gates 22a and 22c-22g to output a "0". The signal from the switch 1 along line 33 causes the OR gate 23t to output a "1" and enables AND gates 22a-22r, so that if a fault is detected by any of the sensors 14-21, the respective AND gate will output a "1". When a fault occurs all of the lamps 27a through 27r and 29 are lighted and the buzzer is energized. For example, the sensor 20 produces a signal "1" if the brake oil temperature has risen above a predetermined value. This signal "1" is applied to the AND gate 22q. The AND gate 22q thereupon produces a signal "1" which is applied to the driver circuit 24q via the OR gate 23q and also to the line 31 via the OR gates 26 and 23s and the check switch 4. The indication lamps 27a through 27r therefore are lighted, the alarm buzzer 28 gives an alarm and the check indication light emitting diode 29 is lighted. Accordingly, the operator can detect the trouble in the vehicle. It should be noted that the parking brake and shift lever are interlocked by means of AND gate 22k and will only light all of the indicator lamps if both of the sensors 14 and 15 are outputting a "1".

In response to the operator's pushing of the check switch 4 in accordance with the lighting of the check indication light emitting diode 29, break contacts 4a, 4a' are opened whereas make contacts 4c, 4c' are closed and the line 31 thereby is grounded. Accordingly, only the indication lamp 27q which corresponds to the place where the trouble has occured, i.e., the brake oil temperature, is lighted, while the other indication lamps 27a through 27p and 27r and the check indication light emitting diode 29 are extinguished and the alarm buzzer 28 stops giving the alarm. Accordingly, the operator can detect the trouble and stop the vehicle for repairing the portion in which the trouble has occurred. After stopping the vehicle, it is necessary for the operator to keep the engine in an idling state after lighting of the check indication light emitting diode 29 even until he has detected the trouble, for the sensors 16 and 21 stop their operation if the engine is stopped.

The vehicle speed is accelerated when the vehicle runs down a slope resulting in overrevolution of the engine. The operator must immediately cope with such situation because the engine will be burnt if such overrevolution continues. The engine overrevolution sensor 16 periodically produces an output signal if the engine revolution has exceeded a set revolution number and supplies this output signal to the AND gate 22l. Accordingly, all of the indication lamps 27a through 27r and the check indication light emitting diode 29 are periodically turned on and off and the alarm buzzer 28 periodically gives an alarm. This enables the operator to distinguish the engine overrevolution from other troubles without going through the checking by means of the check switch 4. If the check switch 4 is used, the corresponding engine overrevolution indication lamp 22l only is periodically turned on and off.

The radiator water sensor 8 functions to check the radiator water level even during driving of the vehicle to prevent burning of the engine due to an abrupt falling of the radiator water level. This arrangement is provided for preventing an accident which could happen if the radiator water temperature sensor 21 should have failed to respond to rise in the radiator water temperature. The checking is facilitated by the use of the OR gate 23t and the AND gate 22s along with the AND gate 22b. During driving, an error signal generated by the sensor 8 will cause the AND gate 22s to output a "1" to the OR gate 26.

By putting simple signs or letters at suitable positions, e.g. light emitting surfaces, on the indication lamps, indication function of the indication lamps can be improved. Alternatively, such signs or letters may also be drawn in the vicinity of the indication lamps, e.g. on the upper side panel board.

What is claimed is:
1. A warning device for a vehicle comprising:
   a starting check unit sensor group including a plurality of sensors respectively provided at a set of predetermined check points in the vehicle for detecting an abnormal state which may exist in any of the check points at a starting check time and thereupon producing an output signal;
   a driving check unit sensor group including a plurality of sensors respectively provided at another set of predetermined check points in the vehicle for detecting an abnormal state which may exist in any of said other set of check points during driving of the vehicle and thereupon producing an output signal;

indication means provided in correspondence to each of said sensors;

an alarm buzzer;

designation means for instructing conduction of a test at a specified rotated position of a key switch before a starter is on;

a first control circuit driven by operation of a test switch by an operator upon instruction by said designation means for driving all of the indication means and the alarm buzzer for a test;

a second control circuit for connecting said starting check unit sensor group with only the indication means corresponding thereto after said test thereby to indicate an abnormal state existing in any of the starting check points; and a third control circuit including a first means for driving all of the indication means and the alarm buzzer in response to the output signal of any sensor of said driving check unit sensor group while the key switch is on and second means for thereafter driving only the indication means corresponding to the check point at which the abnormal state exists.

2. A warning device for a vehicle as defined in claim 1 wherein said first control circuit comprises a circuit, driven by the closing of said test switch, for supplying a power voltage to all of said indication means and said alarm buzzer.

3. A warning device for a vehicle as defined in claim 1 wherein said second control circuit comprises a starting drive signal circuit including a flip-flop which is reset by the closing of said test switch and a plurality of AND gates provided between said starting check unit sensor group and said indication means, wherein said AND gates are enabled by the signal of said starting drive signal circuit.

4. A warning device for a vehicle as defined in claim 1 wherein said third control circuit comprises a plurality of AND gates provided between said driving check unit sensor group and corresponding ones of said indication means and enabled only while the key switch is in the ON position, a normally closed check switch connected to said indication means and a circuit connected to said check switch which transmits the output signal of any sensor of said driving check unit sensor group to all of the indication means and the alarm buzzer via said check switch while said check switch is closed and operates only the indication means corresponding to the sensor producing the output signal while said check switch is opened.

5. A warning device for a vehicles as defined in claim 1 wherein said driving check unit sensor group comprises an engine overrevolution sensor which periodically outputs a signal when an engine revolution number has exceeded a predetermined revolution number, whereby a corresponding one of said indication means is periodically driven during the overrevolution of the engine.

6. A warning device for a vehicle as defined in claim 1 wherein said driving check unit sensor group comprises a parking brake sensor which produces an output when a parking brake is being applied and a shift lever sensor which produces an output when a shift lever is in a position other than a neutral position whereby corresponding ones of said indication means are driven when the shift lever is in a position other than the neutral position while the parking brake is being applied.

7. A warning device as defined in claim 1 wherein a radiator water level sensor in said starting check unit sensor group detects an abnormal state and thereupon produces an output for driving a corresponding one of said indication means even during driving of the vehicle.

8. A warning device for a vehicle or the like, comprising:

a check unit sensor group including a plurality of sensors for detecting abnormal conditions at a plurality of check points;

a plurality of indicators corresponding to the sensors for indicating abnormal conditions which are detected by said sensors;

a control circuit, connected between the sensors and the indicator, said control circuit including first means for driving all of the indicators when an abnormality is detected by any one of the sensors, and second means for thereafter driving only the indicator which corresponds to the sensor which detected an abnormal condition.

9. The warning device of claim 8 wherein:

said first means includes an OR gate having the output of each sensor as an input and a switch coupling the output of the OR gate to all of the indicators, wherein said first means can be uncoupled from said indicators by opening said switch; and said second means includes a plurality of control lines, one each connecting a sensor to its respective indicator.

10. A warning device for a vehicle or the like comprising:

a starting check sensor group including a first plurality of sensors for detecting abnormalities at a first plurality of check points in the vehicle;

a driving check sensor group including a second plurality of sensors for detecting abnormalities at a second plurality of check points in the vehicle;

a first and second plurality of indicators coupled to said first and second sensors respectively;

a first control circuit connected to the first plurality of sensors for initially driving all of the indicators to check their operation and to subsequently drive only those indicators which are coupled to the first plurality of sensors which have detected an abnormality; and a second control circuit, connected to the driving check sensor group, for initially driving all of the indicators when any of the second group of sensors detects an abnormality and subsequently driving only the indicators which are coupled to the second plurality of sensors which have detected an abnormality.

11. The warning device of claim 10 wherein said second control circuit includes a switch having one terminal coupled to all of the sensors of the driving check sensor group and having the other terminal coupled to all of the indicators, whereby when the switch is closed an abnormality which is detected by any of the driving check sensors will cause all of the indicators to be driven.

12. The warning device of claim 10 wherein said switch is manually operable.

* * * * *